United States Patent
Gong

(10) Patent No.: US 7,947,182 B2
(45) Date of Patent: May 24, 2011

(54) NAPHTHENIC ACID REMOVAL PROCESS

(75) Inventor: Xiaoyi Gong, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 513 days.

(21) Appl. No.: 12/201,363

(22) Filed: Aug. 29, 2008

(65) Prior Publication Data
US 2010/0051558 A1 Mar. 4, 2010

(51) Int. Cl.
C02F 1/28 (2006.01)
(52) U.S. Cl. .......................................... 210/691; 210/908
(58) Field of Classification Search ............... 210/502.1, 210/691, 694, 908; 502/69, 417
See application file for complete search history.

(56) References Cited

U.S. PATENT DOCUMENTS

| | | | |
|---|---|---|---|
| 3,960,760 A | 6/1976 | Sanga et al. | |
| 3,968,036 A | 7/1976 | Liles et al. | |
| 4,332,693 A | 6/1982 | Piepho | |
| 4,415,467 A | 11/1983 | Piepho | |
| 4,539,761 A | 9/1985 | Habermehl | |
| 4,775,475 A | 10/1988 | Johnson | |
| 4,818,410 A | 4/1989 | Bellos et al. | |
| 5,135,656 A | 8/1992 | Means et al. | |
| 5,387,566 A | 2/1995 | Porter et al. | |
| 5,439,592 A | 8/1995 | Bellos et al. | |
| 5,922,206 A | 7/1999 | Darlington, Jr. et al. | |
| 6,695,968 B2 | 2/2004 | Hart | |
| 7,435,699 B2 * | 10/2008 | Jolimaitre et al. | 502/64 |
| 2009/0101574 A1 * | 4/2009 | Zubot et al. | 210/631 |

OTHER PUBLICATIONS

Schwartz et al., "The use of fluid catalytic cracking catalyst in activated sludge wastewater treatment", Journal WPCF, vol. 48, No. 2, Feb. 1976, pp. 274-280.

* cited by examiner

*Primary Examiner* — Matthew O Savage

(57) ABSTRACT

A process is disclosed for removing naphthenic acid from a waste water stream using a composition containing a zeolite and carbon, wherein the carbon is present on the exterior surfaces and pore surfaces of the zeolite, for removal of at least a portion of the naphthenic acid from the waste water stream resulting in a treated water stream comprising less naphthenic acid than the waste water stream.

17 Claims, 6 Drawing Sheets

NAPHTHENIC ACID REMOVAL PROCESS

The present invention relates to a process for the removal of naphthenic acid from a waste water stream. In another aspect, this invention relates to a process for the removal of naphthenic acid from a waste water stream by contact with a composition containing zeolite and carbon.

The production of crude oil from underground formations usually produces significant amounts of water referred to as produced water. This produced water often contains water soluble organics, such as naphthenic acid, which are not removed by traditional oil-water separation methods. Since water soluble oils like naphthenic acid can result in environmental problems, there is an incentive to remove them from produced water.

Therefore, development of an improved process for effectively removing naphthenic acid from a waste water stream would be a significant contribution to the art.

BRIEF SUMMARY OF THE INVENTION

In accordance with the present invention, a process is provided for removing naphthenic acid from a waste water stream comprising water and a naphthenic acid which comprises contacting the waste water stream with a composition comprising a zeolite and carbon, wherein the carbon is present on the exterior surfaces and pore surfaces of the zeolite, for removal of at least a portion of the naphthenic acid from the waste water stream resulting in a treated water stream comprising less naphthenic acid than the waste water stream.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION OF THE INVENTION

Figure 1:
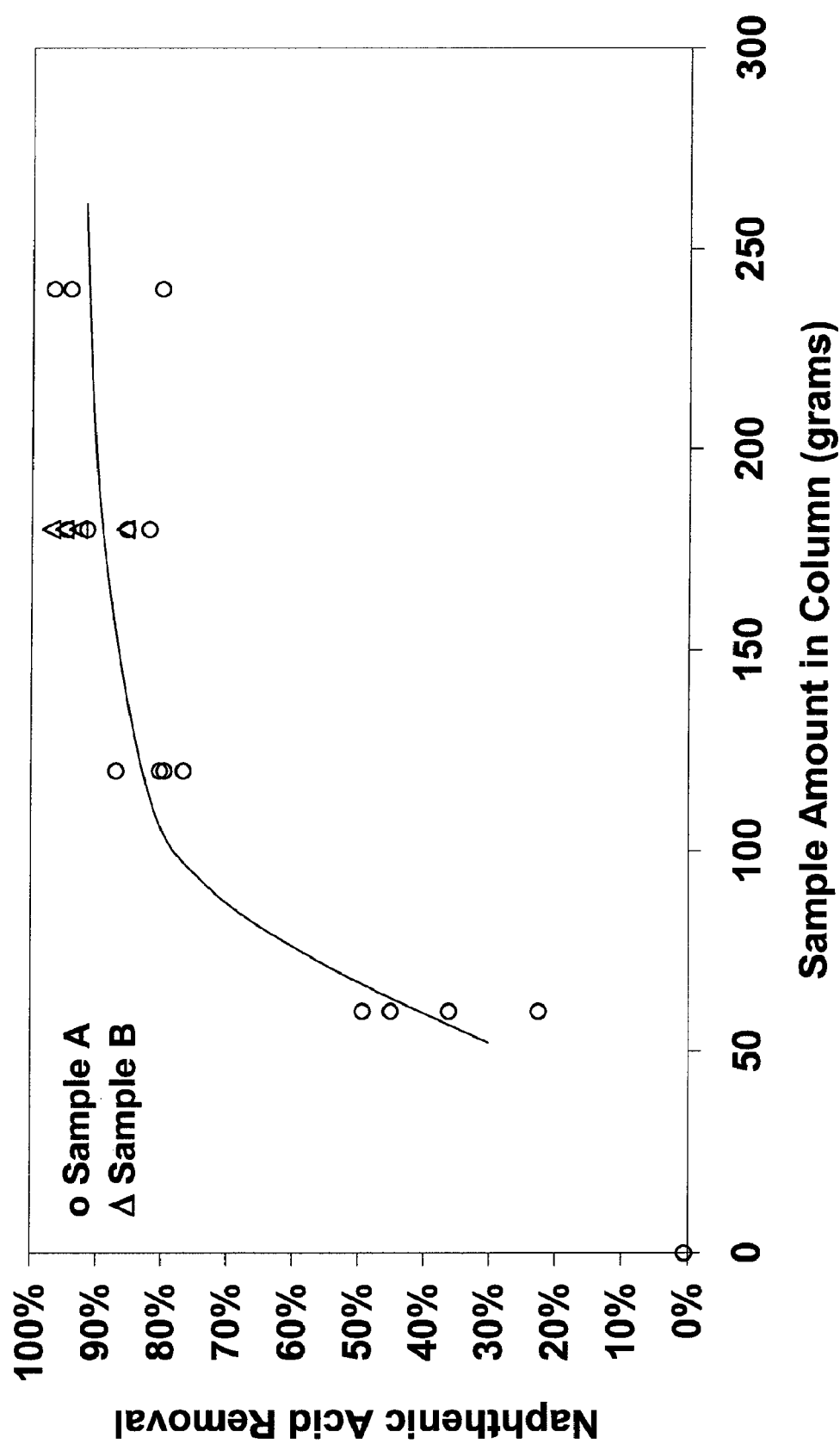
FIG. 1 depicts naphthenic acid removal results.

The waste water stream of this invention can be any waste water stream from any source which comprises water and naphthenic acid. Most typically, the waste water stream is produced water resulting from crude oil production or waste water resulting from crude oil refining operations.

The naphthenic acid preferably has the formula $C_nH_{2n-z}O_2$; wherein z=0, 2, 4, 6, 8, 10 or 12; and wherein n ranges from 6 to 46. More preferably, n ranges from 10 to 24, and most preferably n ranges from 14 to 22.

The waste water stream comprises, consists of, or consists essentially of water and a naphthenic acid. The waste water stream is contacted with a composition comprising, consisting of, or consisting essentially of a zeolite and carbon for removal of at least a portion of the naphthenic acid from the waste water stream resulting in a treated water stream comprising less naphthenic acid than the waste water stream. The carbon is present on the exterior surfaces and pore surfaces of the zeolite of the composition.

The composition preferably contains at least about 0.05% by weight carbon, more preferably at least about 0.07% by weight carbon, and most preferably at least about 0.10% by weight carbon.

The composition preferably has a surface area between about 40 and about 400 m²/g, more preferably between about 150 and about 180 m²/g. The composition also preferably has a micropore volume between about 0.1 cc/g to about 0.5 cc/g and an average particle size between about 20 and about 120 microns.

The composition is preferably obtained by contacting an FCC catalyst comprising a zeolite with a catalytically crackable hydrocarbon thereby forming a catalytically cracked hydrocarbon product and resulting in the composition comprising zeolite and carbon. The most preferred source for the composition is a spent FCC catalyst (or spent FCC catalyst fines) removed from the regenerator section of an FCC unit. Using spent FCC catalysts in this process has the advantage of being an alternative use for an otherwise waste material, which would greatly reduce the cost of treating the waste water.

The composition is not subjected to activation prior to contact with said waste water stream. Such activation includes acid activation defined as contact with an acid in order to acidify the surface to enable adsorption of hydrocarbons of a lewis-base nature.

The waste water stream is contacted with said composition at a temperature preferably in the range of from about 1° C. to about 80° C., more preferably from about 20° C. to about 40° C., and most preferably from about 23° C. to about 28° C.

The treated water stream preferably comprises less than about 50%, more preferably less than about 30%, of the naphthenic acid contained in the waste water stream.

The following examples are provided to further illustrate this invention and are not to be considered as unduly limiting the scope of this invention.

EXAMPLES

A Model Water was prepared by adding approximately 1000 ppm of a naphthenic acid mixture (having a boiling point range of 130° C.-240° C.) to distilled water.

Table 1 includes the properties of three materials tested for naphthenic acid removal from the Model Water. Samples A and B were samples of two different spent FCC catalysts, and Sample C was a sample of fresh FCC catalyst.

TABLE 1

Properties of the fresh and spent catalyst samples used in this investigation

| Sample | Chemistry | Particle Size D10/D50/D90 (μm) | Surface Area (m²/g) |
|---|---|---|---|
| A | $Al_2O_3$ & $SiO_2$, 0.072 wt. % Carbon | 31/65/107 | 147 |
| B | $Al_2O_3$ & $SiO_2$, 0.072 wt. % Carbon | 48/72/108 | 196 |
| C | $Al_2O_3$ & $SiO_2$, 0.001 wt. % Carbon | 23/70/130 | 239 |

Example 1

In each of several runs, approximately 600 ml of the model water was contacted with (filtered through) different amounts of Samples A and B. The overall naphthenic acid removal results for such 600 ml quantities of such experiments are shown in FIG. 1, which demonstrates the effectiveness of a spent catalyst in removing naphthenic acid from water. The data also shows that a higher surface area spent catalyst has improved naphthenic acid removal as compared to a spent catalyst with a lower surface area.

Example 2

Figure 2:
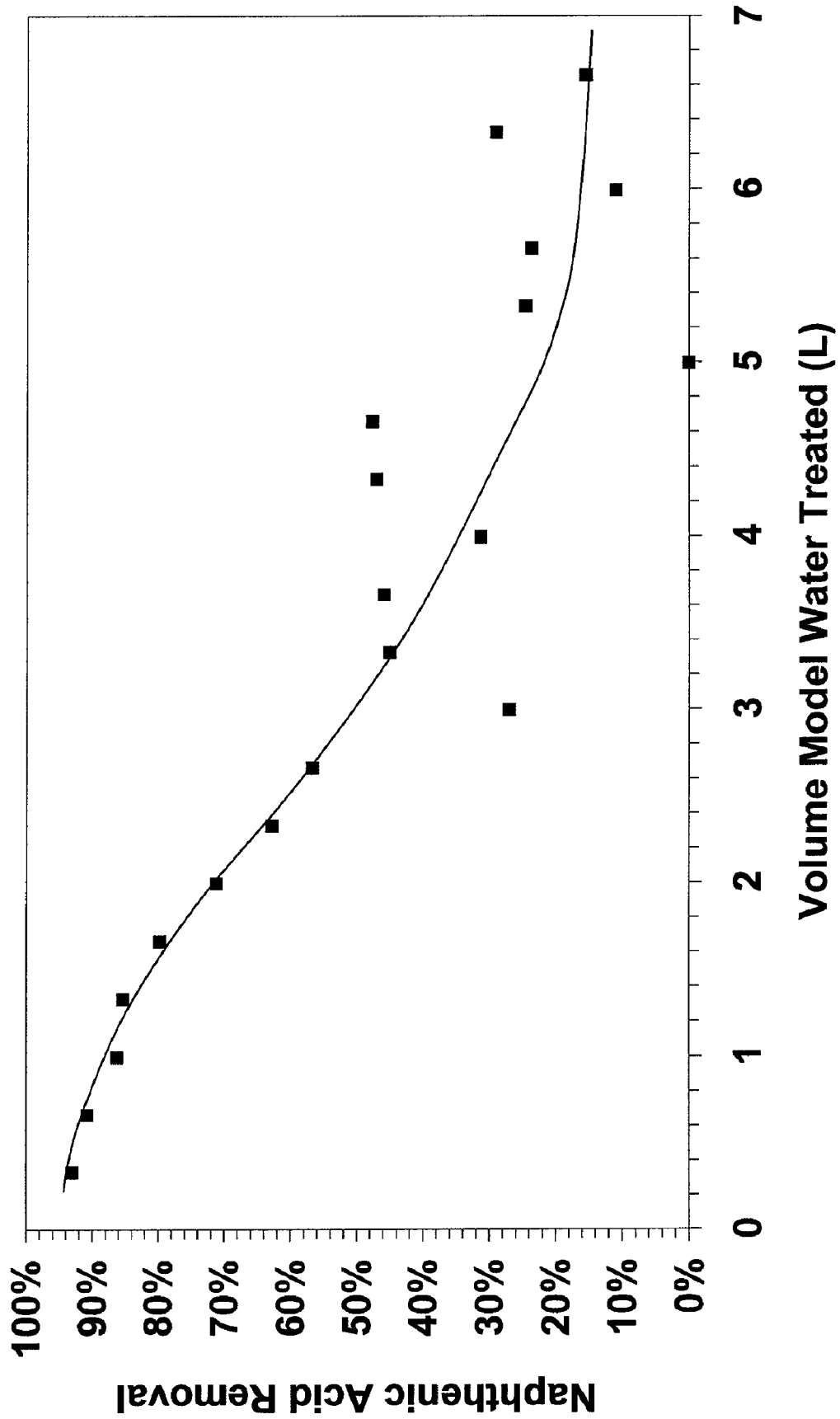
FIG. 2 depicts naphthenic acid removal results.
Figure 3:
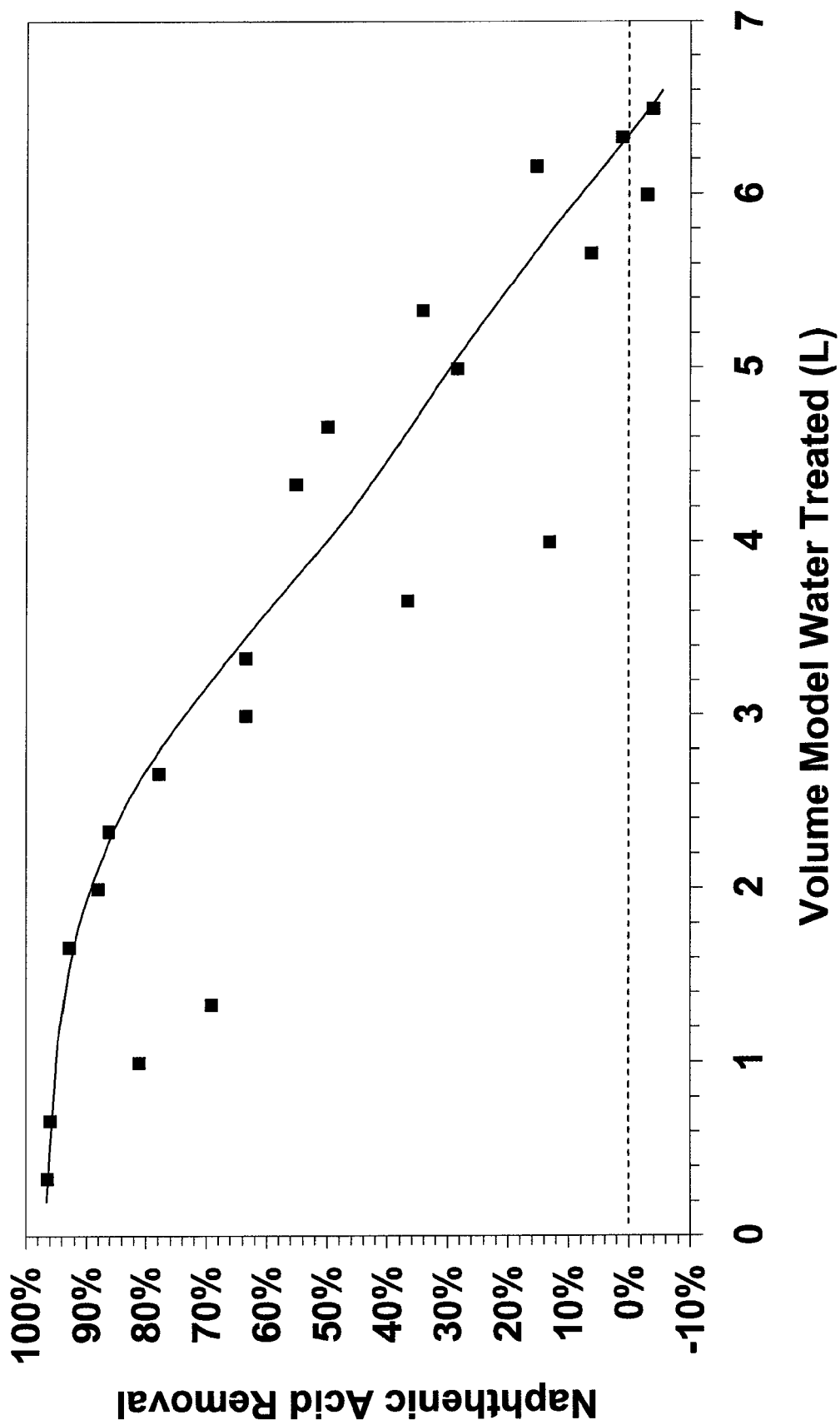
FIG. 3 depicts naphthenic acid removal results.
Figure 4:
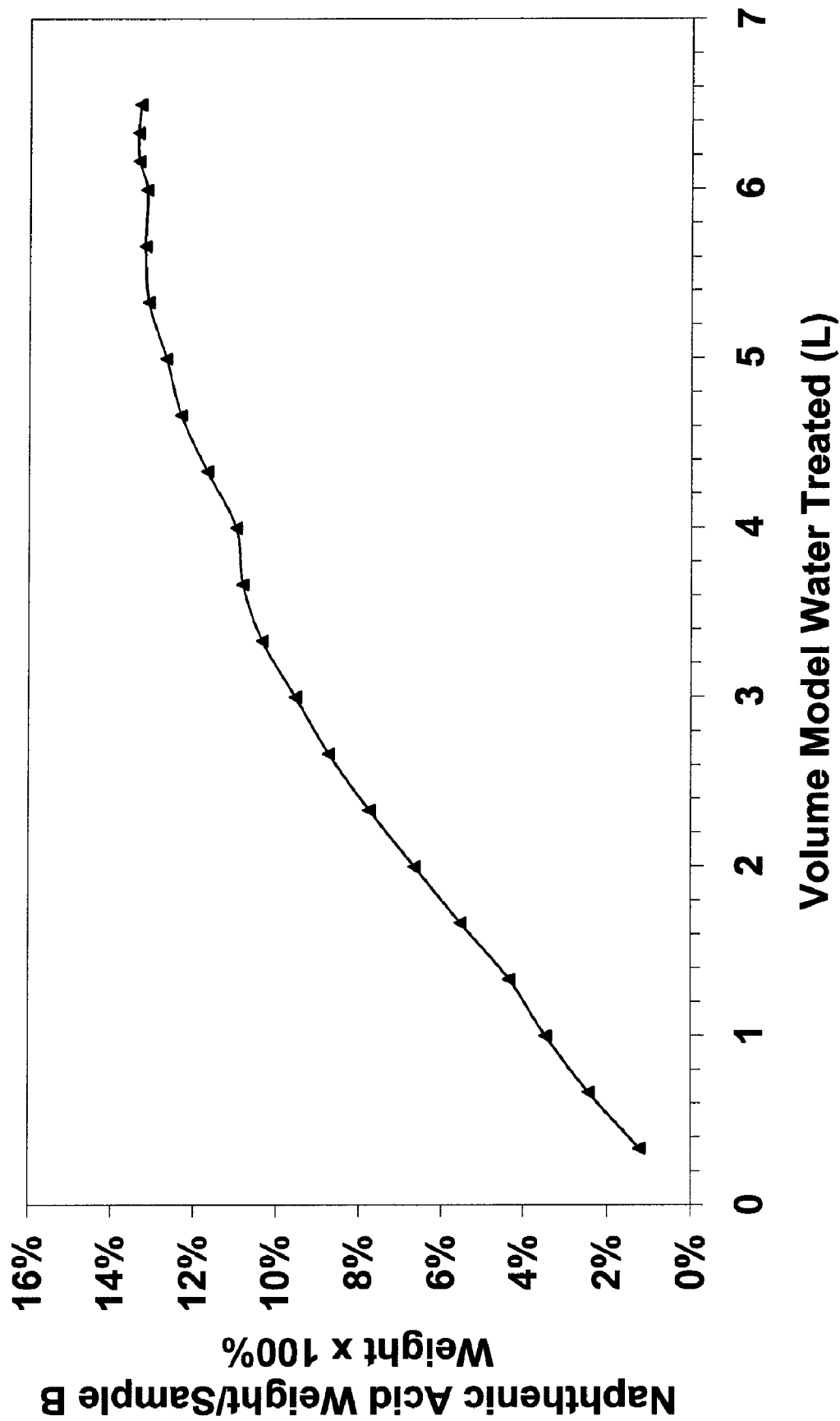
FIG. 4 depicts naphthenic acid weight and sample weight loading.
Figure 5:
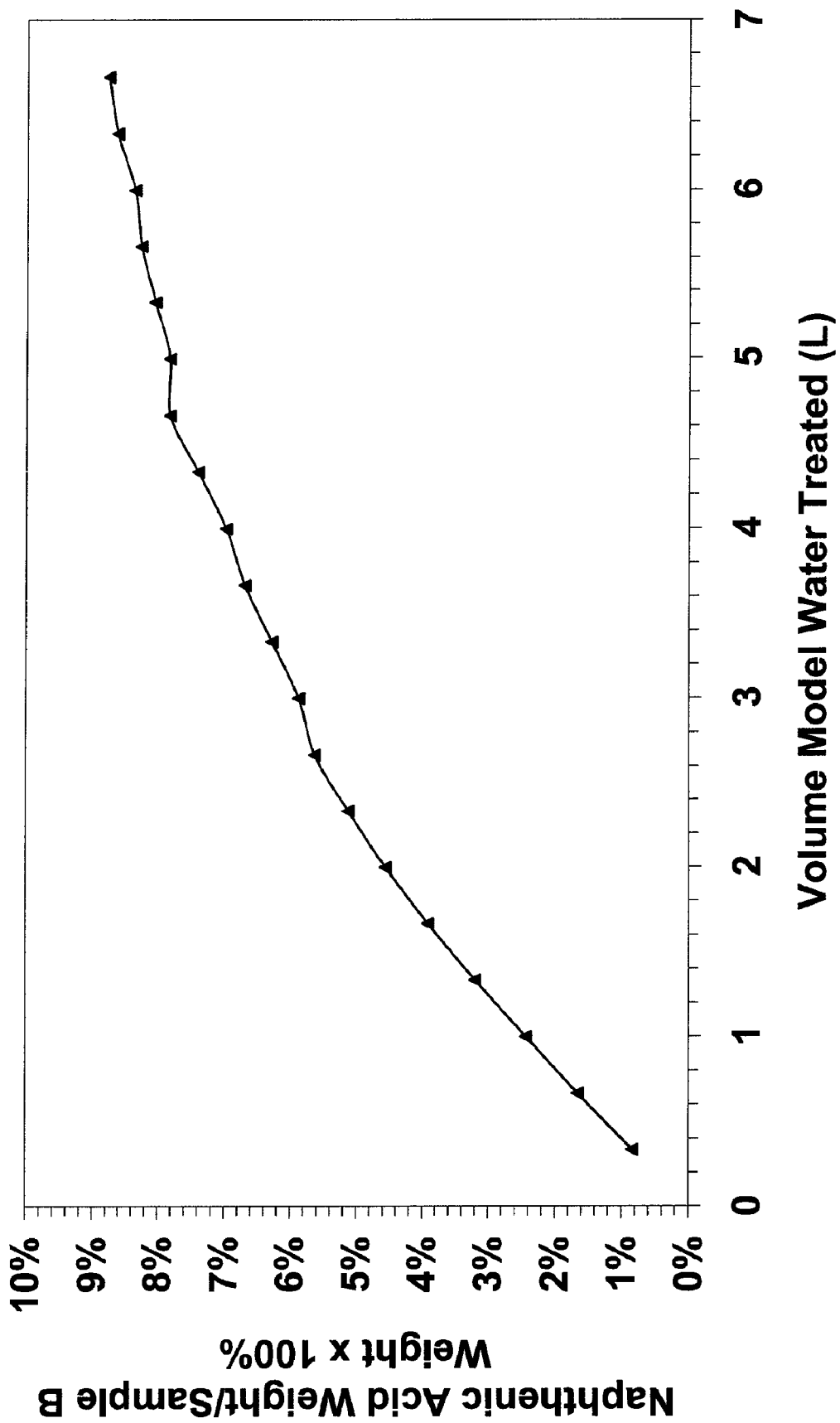
FIG. 5 depicts naphthenic acid weight and sample weight loading.

In two separate experiments, approximately 70 ml/min of the model water was contacted with (filtered through) approximately 180 gram portions of Sample B at around 20° C. The naphthenic acid removal results of such experiments are shown in FIG. 2 for experiment 1, and in FIG. 3 for experiment 2. FIG. 4 shows the naphthenic acid weight/Sample B weight loading for experiment 1. FIG. 5 shows the naphthenic acid weight/Sample B weight loading for experiment 2. The data demonstrates the effectiveness of a spent catalyst in removing naphthenic acid from water.

Example 3

Figure 6:
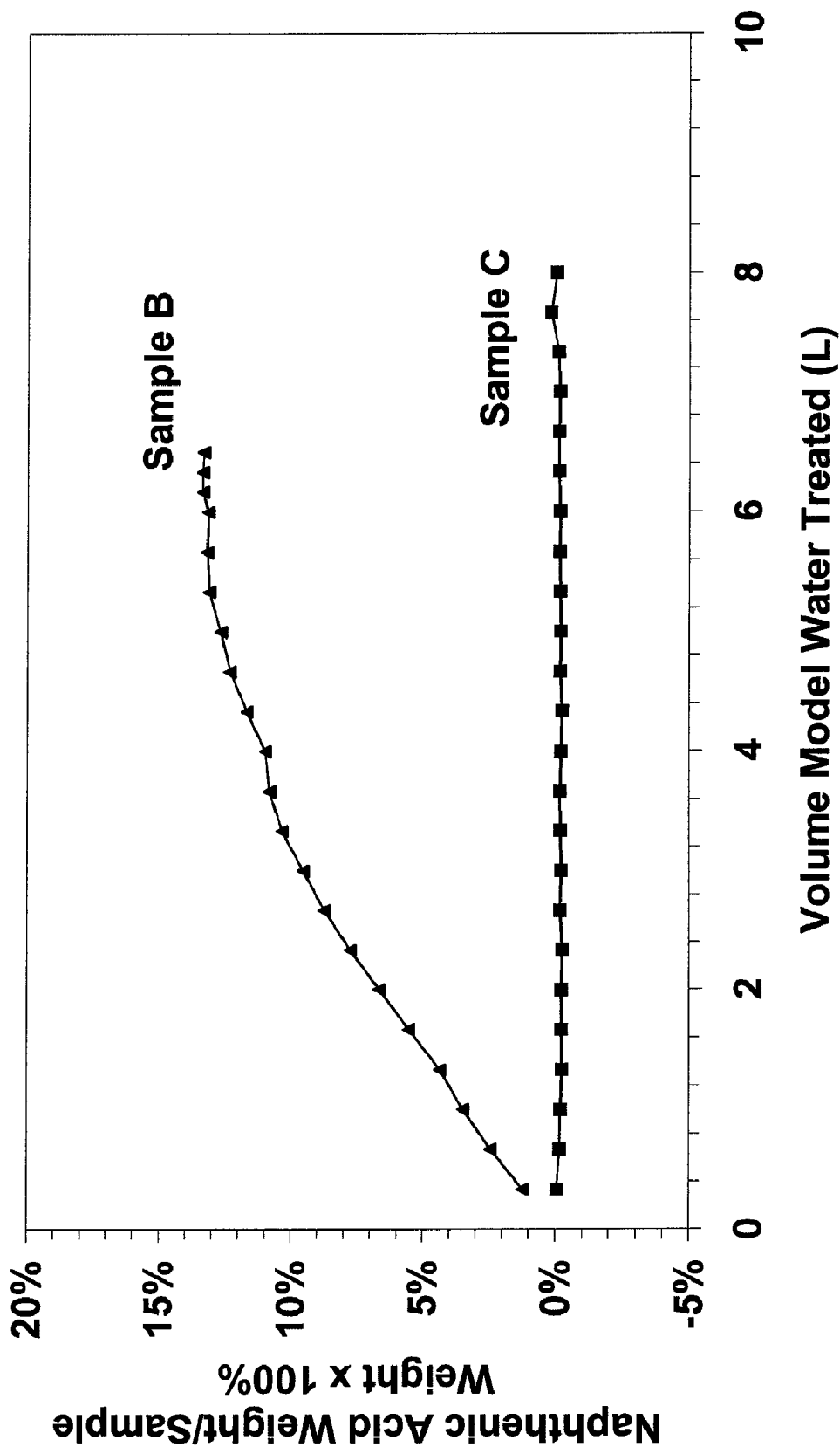
FIG. 6 depicts naphthenic acid weight and sample weight loading.

Approximately 15-20 ml/min of the model water was separately contacted with (filtered through) approximately 30 gram quantities of Samples B and C at around 20° C. The naphthenic acid weight/Sample weight loading for each of Samples B and C is shown in FIG. 6. The data demonstrates the effectiveness of a spent catalyst in removing naphthenic acid from water, compared to the ineffectiveness of the fresh catalyst.

While this invention has been described in detail for the purpose of illustration, it should not be construed as limited thereby but intended to cover all changes and modifications within the spirit and scope thereof.

That which is claimed is:

1. A process for removing naphthenic acid from a waste water stream comprising water and a naphthenic acid which comprises contacting said waste water stream with a composition comprising a zeolite and carbon, wherein said carbon is present on the exterior surfaces and pore surfaces of said zeolite, for removal of at least a portion of the naphthenic acid from said waste water stream resulting in a treated water stream comprising less naphthenic acid than said waste water stream.

2. The process of claim 1 wherein said composition contains at least about 0.05% by weight carbon.

3. The process of claim 1 wherein said composition contains at least about 0.07% by weight carbon.

4. The process of claim 1 wherein said composition contains at least about 0.10% by weight carbon.

5. The process of claim 1 wherein said composition has a surface area between about 40 and about 400 $m^2/g$.

6. The process of claim 1 wherein said composition has a surface area between about 150 and about 180 $m^2/g$.

7. The process of claim 1 wherein said composition has a micropore volume between about 0.1 cc/g to about 0.5 cc/g and an average particle size between about 20 and about 120 microns.

8. The process of claim 1 wherein said naphthenic acid has the formula $C_nH_{2n-z}O_2$; wherein z=0, 2, 4, 6, 8, 10 or 12; and wherein n ranges from 6 to 46.

9. The process of claim 8 wherein n ranges from 10 to 24.

10. The process of claim 8 wherein n ranges from 14 to 22.

11. The process of claim 1 wherein said waste water stream is contacted with said composition at a temperature in the range of from about 1° C. to about 80° C.

12. The process of claim 1 wherein said waste water stream is contacted with said composition at a temperature in the range of from about 20° C. to about 40° C.

13. The process of claim 1 wherein said waste water stream is contacted with said composition at a temperature in the range of from about 23° C. to about 28° C.

14. The process of claim 1 wherein said treated water stream comprises less than about 50% of the naphthenic acid contained in said waste water stream.

15. The process of claim 1 wherein said treated water stream comprises less than about 30% of the naphthenic acid contained in said waste water stream.

16. The process of claim 1 wherein said composition is obtained by:
    contacting an FCC catalyst comprising a zeolite with a catalytically crackable hydrocarbon thereby forming a catalytically cracked hydrocarbon product and resulting in said composition comprising zeolite and carbon.

17. The process of claim 16 wherein said composition is not subjected to activation prior to contact with said waste water stream.

* * * * *